United States Patent
Moles et al.

(10) Patent No.: US 7,209,705 B2
(45) Date of Patent: Apr. 24, 2007

(54) METHOD AND APPARATUS FOR OPTIONAL AUTOMATIC CONFIGURATION OF WIRELESS COMMUNICATIONS DEVICE BEHAVIOR WITHIN SMALL AREA TRANSMITTER SERVICE REGIONS

(75) Inventors: Bryan Jeffrey Moles, Dallas, TX (US); Sudhindra Pundaleeka Herle, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 756 days.

(21) Appl. No.: 09/992,818

(22) Filed: Nov. 14, 2001

(65) Prior Publication Data

US 2003/0092383 A1 May 15, 2003

(51) Int. Cl.
*H04B 7/00* (2006.01)

(52) U.S. Cl. ............... 455/41.2; 455/422.1; 455/461; 455/465

(58) Field of Classification Search ............. 455/452.1, 455/453.1, 456, 462, 465, 41.2, 41.3, 422.1, 455/552.1, 553.1, 41.1, 461
See application file for complete search history.

(56) References Cited

U.S. PATENT DOCUMENTS

| | | | | |
|---|---|---|---|---|
| 5,991,614 A | * | 11/1999 | Oura | 455/404.1 |
| 6,122,486 A | * | 9/2000 | Tanaka et al. | 455/68 |
| 6,141,560 A | * | 10/2000 | Gillig et al. | 455/553.1 |
| 6,246,891 B1 | * | 6/2001 | Isberg et al. | 455/574 |
| 6,421,544 B1 | * | 7/2002 | Sawada | 455/565 |
| 6,625,455 B1 | * | 9/2003 | Ariga | 455/456.1 |
| 6,701,144 B2 | * | 3/2004 | Kirbas et al. | 455/417 |
| 6,782,266 B2 | * | 8/2004 | Baer et al. | 455/456.4 |
| 6,907,254 B1 | * | 6/2005 | Westfield | 455/456.4 |
| 2002/0142792 A1 | * | 10/2002 | Martinez | 455/550 |
| 2003/0051041 A1 | * | 3/2003 | Kalavade et al. | 709/229 |

* cited by examiner

*Primary Examiner*—Matthew D. Anderson
*Assistant Examiner*—Tuan Pham

(57) ABSTRACT

A zone-based behavior service is supported by a small area wireless transmitter to communicate behaviors, encoded as attribute-value pairs, to wireless devices within the service area of the small area transmitter. In response to entering the service area and discovering the zone-based behavior service, operation of a wireless communications device is automatically customized to conform to the specified behaviors according to corresponding user preferences. For example, audible ring tones are automatically disabled when proscribed by the zone-based behavior service and such proscription is accepted by the user in previously defined attribute options, but automatic re-routing of incoming calls suggested by the behavior service may be rejected by the user or require manual acceptance from the user. Upon leaving the service area of the small area transmitter, the wireless communications device automatically restores prior operational parameters.

22 Claims, 3 Drawing Sheets

METHOD AND APPARATUS FOR OPTIONAL AUTOMATIC CONFIGURATION OF WIRELESS COMMUNICATIONS DEVICE BEHAVIOR WITHIN SMALL AREA TRANSMITTER SERVICE REGIONS

TECHNICAL FIELD OF THE INVENTION

The present invention is directed, in general, to operation of wireless communications devices and, more specifically, to automatic customization of the operation of wireless communications devices within the service area of small wireless transmitters.

BACKGROUND OF THE INVENTION

Use of wireless communications devices such as mobile phones and wireless personal digital assistants (PDAs) has become prevalent for both business and personal purposes. However, operation of such wireless devices is restricted in some environments, either by official policy or by social convention. Use of wireless communications devices on aircraft during flight, for example, is prohibited by federal regulation. In addition, most courtrooms and other official government offices or hearing chambers require wireless communications devices to be turned off or set to an "inaudible" mode in which no audible ring tones or the like are generated by the wireless communications devices.

Even in situations when operation of wireless communications devices is not formally or officially proscribed or regulated, users or enterprises may wish to automatically customize or control operation of wireless communications devices in selected environments. Within a conference room, for instance, a user or enterprise may wish to automatically set all wireless communications devices to inaudible mode (including a silent "vibrate" mode, if available), and/or route all incoming calls or messages to voicemail or other temporary storage. As another example, a user may wish the wireless communications device to automatically switch to a "handsfree" mode when the user enters the user's automobile.

In other situations, security within a building may wish to transmit a material pass number to a wireless device when the user enters the building, to verify that the wireless communications device should be permitted to leave the building later. Alternatively, the user may wish to automatically obtain useful information when entering a building, such as a building map, schedule of events, public printer queue names, and the like, which may be automatically downloaded to the wireless communications device for ready access.

There is, therefore, a need in the art for automatic customization of the operation of wireless communications devices within small size geographic regions.

SUMMARY OF THE INVENTION

To address the above-discussed deficiencies of the prior art, it is a primary object of the present invention to provide, for use in wireless communications system, a zone-based behavior service supported by a small area wireless transmitter to communicate behaviors, encoded as attribute-value pairs, to wireless devices within the service area of the small area transmitter. In response to entering the service area and discovering the zone-based behavior service, operation of a wireless communications device is automatically customized to conform to the specified behaviors—for example, audible ring tones are automatically disabled when proscribed by the zone-based behavior service. Upon leaving the service area of the small area transmitter, the wireless communications device automatically restores prior operational parameters.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
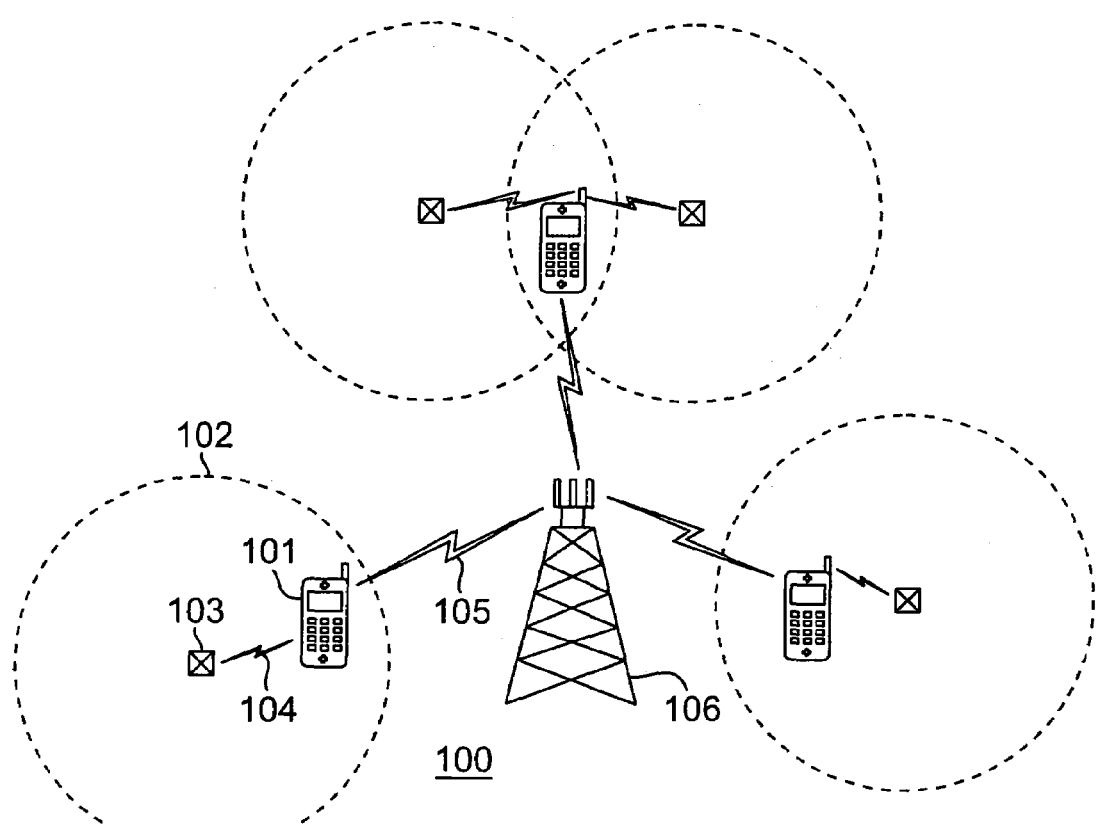
FIG. 1 depicts a wireless communications device employing automatic zone-based behavior customization within the service area of a small area transmitter according to one embodiment of the present invention.
Figure 2:
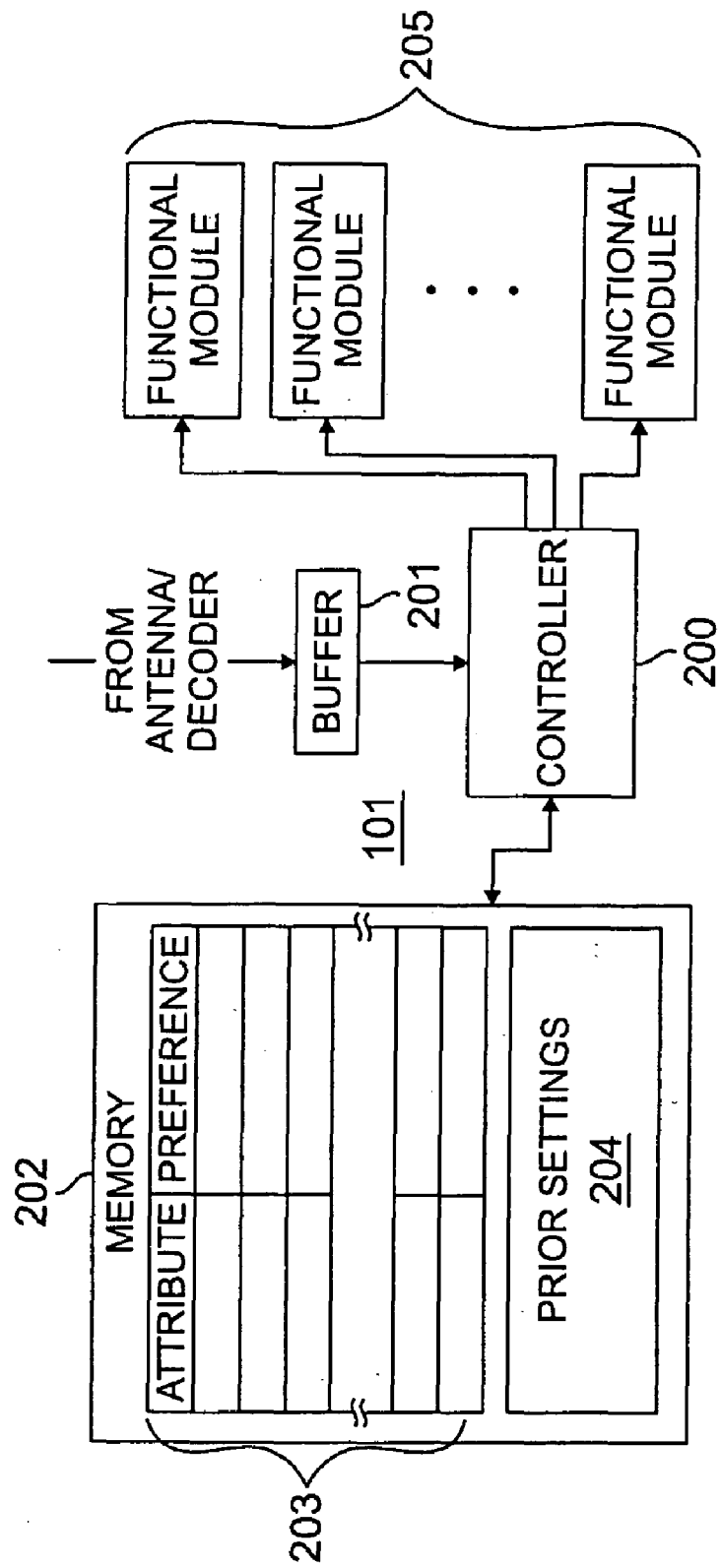
FIG. 2 is a high level block diagram of a wireless communications device employing automatic behavior customization within small area transmitter service regions according to one embodiment of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a wireless communications device employing automatic zone-based behavior customization within the service area of a small area transmitter according to one embodiment of the present invention. The present invention is implemented within a wireless communications system 100 including a wireless communications device 101. Wireless communications device 101 is depicted as a mobile telephone in the exemplary embodiment, but those skilled in the art will recognize that any suitable wireless communications device may be employed, including a personal digital assistant, a paging device, or a laptop computer.

When within the service area 102 of a small area transmitter 103, wireless communications device 101 automatically establishes a wireless communications link 104 with the small area transmitter 103. In addition to wireless communications link 104, wireless communications device 101 may also maintain a wireless communications link 105 with a base station 106 for a large area wireless communications systems, such as a wireless telephone carrier. Such a wireless communications link is not strictly necessary since the present invention may be implemented, for instance, in a network of small area transceivers each having a service area (colloquially referred to as a "zone") overlapping or coterminous with adjacent small area transmitter(s), forming a fine-grain wireless communications system.

Small area transmitter 103 is a wireless transceiver operating within a small service area 102. For example, in the exemplary embodiment small area transmitter 103 preferably operates according to the Bluetooth specification promulgated by the Bluetooth Special Interest Group (Bluetooth SIG, Inc.) and available at www.bluetooth.com or www.bluetooth.org.

Generally speaking, Bluetooth is a short-range radio frequency (RF) wireless connectivity technology which enables features such as cable replacement (with wireless connections), wireless local area network (LAN) access within a short distance, and ad-hoc networks between several devices. Bluetooth normally supports distances of up to 10 meters, the broadcast or service area radius of small transmitter area 102 in the exemplary embodiment.

The Bluetooth specification defines a Service Discovery Protocol (SDP) for Bluetooth conforming devices, providing a standard method for the conforming device to discover services available in a Bluetooth network. Both the availability and unavailability of a service may be discovered, including availability or unavailability due to the addition or removal or a service or due to entering or leaving the service area of a serving network node.

In the present invention, the Service Discovery Protocol is employed to implement a zone-based "behavior service" defining and presenting a set of behaviors encoded as attribute-value pairs communicated by small area transmitter 103 to wireless communications device 101 when wireless communications device 101 enters service area 102. For example, the attribute-value pair <AudibleRing=NO> could be defined to prevent wireless communications devices from generating an audible ring tone indicating an incoming call or message.

Small area transmitter 103 advertises the availability of the zone-based behavior service of the present invention, providing the attribute-value pairs either automatically as part of advertising the service availability or in response to requests for such attribute-value pairs. Upon entering service area 102, wireless communications device 101 detects the service and, if configured to employ adaptive behavior configuration, obtains the available attribute-value pairs. The attribute-value pairs are read and interpreted by the wireless communications device 101, which employs the attribute-value pairs to automatically customize operation of the wireless communications device 101 while within service area 102.

"Automatic" customization of wireless communications device behavior is not intended to imply that the wireless communications device is forced to adhere to behaviors defined by the received attribute-value pairs while within service area 102. Instead, behavior is adapted according to previously defined user preferences for accepting or rejecting automatic configuration according to received attribute-value pairs on an attribute-by-attribute basis. The user may thus establish automatic acceptance of selected behaviors and automatic rejection of others (as well as global acceptance/rejection), or automatic acceptance of selected behaviors, acceptance or rejection of selected behaviors only after notification and manual acceptance/rejection by the user, and automatic rejection of remaining behaviors. Moreover, automatic acceptance of customized device behavior for one attribute-value pair may be conditioned on the value of other attribute-value pairs, as discussed in further detail below. When an unrecognized attribute is encountered by wireless communications device 101, the user may be notified or the attribute-value pair simply ignored, depending on user preferences.

As a specific illustration of the present invention, a user may enter a conference room in which a small area transmitter 103 for a Bluetooth network node is situated. (While the service area of the Bluetooth node is likely to be larger than the physical area of a conference room, such discrepancies may be tolerated or, if necessary, conformed through shielding of the conference room to restrict the service area of the Bluetooth node.)

Upon entry into the conference room, a wireless communications device 101 attached by a belt clip to the user makes a connection to the Bluetooth node and begins service discovery, discovering the zone-based behavior service. An integral application within the wireless communications device 101 communicates with the zone-based behavior service to obtain the attribute-value pair behavior parameters for the service area 102 of small area transmitter 103 (i.e., the conference room).

Upon reception and decoding of the behavior parameters, the wireless communications device 101 encounters the attribute-value pair indicating that audible ringing is discouraged within the service area 102 and automatically sets the ring setting for wireless communications device 101 to a silent (e.g., vibrate) mode or turns the wireless communications device 101 off, depending on the capabilities of wireless communications device 101 and/or user preferences.

When the user leaves the conference room and wireless communications device 101 discovers that the zone-based behavior service is either no longer available, wireless communications device 101 automatically restores the ring setting in effect prior to entry into the conference room. Alternatively, if the user simply passes from one service area to another small area transmitter service area supporting a different set of attribute-value pairs, wireless communications device 101 may simply conform to behaviors specified by the attribute-value pairs now available.

In like manner, each of the behaviors described above (switching to hands free mode), and the actions described above (receiving a material pass, or downloading public information) automatically performed, when the user enters the geographic area of a small area transmitter (e.g., an automobile or airplane, a building entryway, etc.). Many other behaviors and/or actions may also be automatically set or performed in response to pre-specified options selected by the user for the attribute-value pairs.

Each zone supporting zone-based behavior service may have an administrator assigned permanently (e.g., an administrative staff member), temporarily (e.g., the individual reserving the conference room), or on an ad hoc basis (e.g., by a panel in the conference room employed to set attribute values). The administrator may set or modify attribute-value pairs for either indefinite or finite time periods. Administrative access for setting or modifying attribute-value pairs may be either direct, through a use interface on the small area transmitter, or remote, through a defined interface allowing a remote intranet server to control the settings in response to user input into a HyperText Markup Language (HTML) page or formatted (e.g., tag delimited) electronic mail message body.

Global sets of attribute names, values and interpretations should preferably be standardized across small area transmitters and wireless communications devices, regardless of manufacturer, and should preferably employ naming conventions allowing the attribute and values to be fairly self-evident to the user. Upon encountering an unrecognized attribute or value, a wireless communications device may log the attribute and value pair for later (offline) use by the user in writing rules for future handling of the attribute or value.

Conformance to zone-base behavior specified by attribute-value pairs may itself be the subject of an attribute-value pair, such that conformance may be specified as either mandatory or non-mandatory but suggested. However, even a "mandatory conformance" attribute-value pair will not result in the wireless communications device 101 being forced to conform to the suggested behavior; the wireless communications device behavior will only be automatically configured in conformance with the received attribute value pair if the user has previously elected to comply with such "mandatory" behavior suggestions. Additionally, such acceptance may be conditioned on still other attribute-value pairs, such as one identifying the type of enterprise controlling the small area transmitter (e.g., a restaurant or movie theater "requiring" that audible ring tones be suppressed).

While the exemplary embodiment of the present invention employs Bluetooth, those skilled in the art will recognize that the present invention is equally applicable to similar small area wireless communications protocols such as Service Location Protocol (SLP), Jini, and Salutation. The model of service discovery is preferably, but not necessarily, employed regardless of the communications protocol utilized.

As shown in the drawings, small area transmitters supporting behavior service may be irregularly situated and may even have overlapping service areas. The attribute-value pairs for small area transmitters having overlapping service areas preferably do not conflict (which should be possible since both transmitters are likely to be operated by the same enterprise), although rules for handling such conflicts may be specified by the wireless communications device designer and/or user.

FIG. 2 is a high level block diagram of a wireless communications device employing automatic behavior customization within small area transmitter service regions according to one embodiment of the present invention. Wireless communications device 101 includes a controlling 200 receiving attribute-value pairs from a small area transmitter, with optional buffering within buffer 201. Controller 200 checks a memory 202 for user-defined preferences 203 for each attribute within the received attribute-value pairs. Controller 200 may store a listing 204 of current behavior settings for wireless communications device 101, either all behavior settings or simply those being altered in response to receiving the attribute-value pairs. Controller 200 then modifies the behavior of various functional modules 205 within wireless communications device 101 according to the received attribute-value pairs and the associated user preferences 203 for such attributes.

Figure 3:
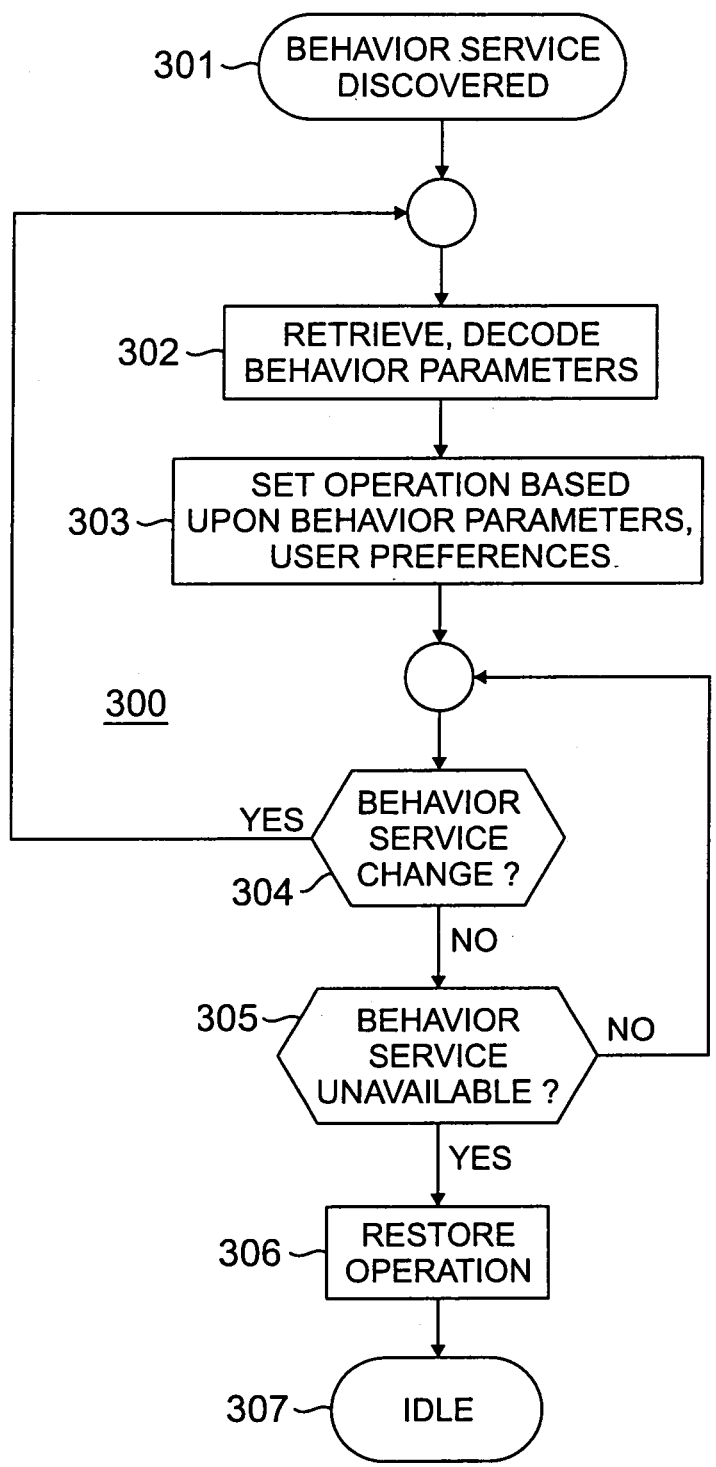
FIG. 3 is a high level flow chart for automatic zone-based behavior customization according to one embodiment of the present invention.

FIG. 3 is a high level flow chart for automatic zone-based behavior customization according to one embodiment of the present invention. The process 300 begins with a wireless communications device entering a zone and discovering a zone-specific behavior service supported by that zone (step 301). The behavior parameters are retrieved and decoded (step 302) and compared to user preferences for the corresponding attributes, then operation of the wireless device is automatically customized to conform as far as possible to the behaviors specified in view of the user's preferences (step 303).

The wireless communications device then begins monitoring for a change or termination of the behavior service (steps 304 and 305), indicating that the wireless communications device has left the zone and (possibly) entered another zone. A change in the behavior service simply results in the new behavior parameters being retrieved and decoded, with operation of the wireless device customized to the new parameters. Once the behavior service is unavailable, however, the wireless communications device restores operations to the state prior to any automatic customization based upon behavior services (step 306). The process then becomes idle (step 307) until a behavior service is again discovered.

The present invention allows operation of wireless devices to be automatically customized in selected geographic regions, where the geographic regions correspond roughly to areas of particular interest such as buildings or rooms therein, automobiles, airplanes, and the like. The need for manual changes to the device operation is thereby obviated.

It is important to note that while the present invention has been described in the context of a fully functional communications device or system, those skilled in the art will appreciate that the mechanism of the present invention is capable of being implemented and distributed in the form of a computer usable medium of instructions in a variety of forms, and that the present invention applies equally regardless of the particular type of signal bearing medium is used to carry out the distribution. Examples of suitable computer usable mediums include: nonvolatile, hard-coded or programmable type mediums such as read only memories (ROMs) or erasable, electrically programmable read only memories (EEPROMs), recordable type mediums such as floppy disks, hard disk drives, and read/write (R/W) compact disc read only memories (CD-ROMs) or digital versatile discs (DVDs), and transmission type mediums such as digital and analog communications links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. For use in a wireless communications system, a system for automatically customizing operation of a wireless device comprising:
 a small area transmitter supporting wireless connectivity with wireless devices and a behavior service defining behavior of wireless devices within a service area for the small area transmitter,
 wherein a wireless device,
  upon detecting the behavior service upon entering the service area and receiving a behavior set from the small area transmitter, automatically sets operation of the wireless device to conform to the behavior set and associated user preferences, and
  upon detecting unavailability of the behavior service following previous availability of the behavior service, automatically restores operation of the wireless device to a state existing prior to automatic setting of the operation of the wireless device to conform to the behavior set and associated user preferences.

2. The system as set forth in claim 1 wherein the behavior service defines behavior of wireless devices through a set of attribute-value pairs.

3. The system as set forth in claim 1 wherein the behavior service becomes unavailable as a result of the wireless device leaving the service area of the small area transmitter.

4. For use in a wireless communications system, a system for automatically customizing operation of a wireless device comprising:
 a wireless device configured to communicate with small area transmitters supporting wireless connectivity with wireless devices and a behavior service defining behavior of wireless devices within a service area for the small area transmitter,
 wherein the wireless device,
  upon detecting the behavior service when entering the service area and receiving a behavior set from the small area transmitter, automatically sets operation of the wireless device to conform to the behavior set and associated user preferences, and
  upon detecting unavailability of the behavior service following previous availability of the behavior service, automatically restores operation of the wireless device to a state existing prior to automatic setting of the operation of the wireless device to conform to the behavior set and associated user preferences.

5. The system as set forth in claim 4 wherein the behavior service defines behavior of wireless devices through a set of attribute-value pairs.

6. The system as set forth in claim 4 wherein the behavior service becomes unavailable as a result of the wireless device leaving the service area of the small area transmitter.

7. The system as set forth in claim 4 wherein the user preferences specify, for each behavior associated with a known attribute within attribute-value pairs received from the small area transmitter, one of automatic acceptance of the behavior, automatic rejection of the behavior, and notification of a user for manual acceptance or rejection of the behavior, wherein the acceptance, rejection, or notification maybe conditional or unconditional.

8. For use in a wireless communications system, a system for automatically customizing operation of a wireless device comprising:
 a small area transmitter supporting wireless connectivity and a behavior service defining behavior of wireless devices within a service area for the small area transmitter; and
 a controller within the wireless device, wherein the controller is capable of detecting the behavior service upon entering the service area,
  receiving a behavior set from the small area transmitter,
  automatically setting operation of the wireless device to conform to the behavior set and associated user preferences, and
  detecting unavailability of the behavior service and automatically restoring operation of the wireless device to a state existing prior to automatic setting of the operation of the wireless device to conform to the behavior set.

9. The system as set forth in claim 8 wherein the behavior service defines behavior of wireless devices through a set of attribute-value pairs.

10. The system as set forth in claim 8 wherein the behavior service becomes unavailable as a result of the wireless device leaving the service area of the small area transmitter.

11. The system as set forth in claim 8 wherein the user preferences specify, for each behavior associated with a known attribute within attribute-value pairs received from the small area transmitter, one of automatic acceptance of the behavior, automatic rejection of the behavior, and notification of a user for manual acceptance or rejection of the behavior, wherein the acceptance, rejection, or notification may be conditional or unconditional.

12. For use in a wireless communications system, a method of automatically customizing operation of a wireless device comprising:
 providing, from a small area transmitter supporting wireless connectivity with wireless devices, a behavior service defining behavior of wireless devices within a service area for the small area transmitter;
 upon detecting the behavior service upon entering the service area and, at the wireless device, receiving a behavior set from the small area transmitter, automatically setting operation of the wireless device to conform to the behavior set and associated user preferences; and
 upon detecting unavailability of the behavior service following previous availability of the behavior service, automatically restoring operation of the wireless device to a state existing prior to automatic setting of the operation of the wireless device to conform to the behavior set and associated user preferences.

13. The method as set forth in claim 12 wherein the step of providing a behavior service defining behavior of wireless devices within a service area for the small area transmitter further comprises:
 transmitting a set of attribute-value pairs for reception by wireless devices within the service area.

14. The method as set forth in claim 12 further comprising:
 leaving the service area of the small area transmitter, wherein the behavior service becomes unavailable to the wireless device.

15. For use in a wireless communications system, a method of automatically customizing operation of a wireless device configured to communicate with small area transmitters supporting wireless connectivity with wireless devices and a behavior service defining behavior of wireless devices within a service area for the small area transmitter, the method comprising:

upon detecting the behavior service when entering the service area and, at the wireless device, receiving a behavior set from the small area transmitter, automatically setting operation of the wireless device to conform to the behavior set and associated user preferences; and upon detecting unavailability of the behavior service following previous availability of the behavior service, automatically restoring operation of the wireless device to a state existing prior to automatic setting of the operation of the wireless device to conform to the behavior set and associated user preferences.

16. The method as set forth in claim 15 wherein the step of receiving a behavior service defining behavior of wireless devices within a service area for the small area transmitter further comprises:

receiving a set of attribute-value pairs transmitted by the small area device.

17. The method as set forth in claim 15 further comprising:

leaving the service area of the small area transmitter, wherein the behavior service becomes unavailable to the wireless device.

18. The method as set forth in claim 15, further comprising specifying, within the user preferences, one of automatic acceptance of the behavior, automatic rejection of the behavior, and notification of a user for manual acceptance or rejection of a behavior for each behavior associated with a known attribute within attribute-value pairs received from the small area transmitter, wherein the acceptance, rejection, or notification maybe conditional or unconditional.

19. For use in a wireless communications system, a method of automatically customizing operation of a wireless device comprising:

providing a behavior service defining behavior of wireless devices within a service area for a small area transmitter supporting wireless connectivity to the wireless devices;

detecting the behavior service within a wireless device upon entering the service area and receiving a behavior set from the small area transmitter;

automatically setting operation of the wireless device to conform to the behavior set and associated user preferences;

detecting unavailability of the behavior service within a wireless device, following previous availability of the behavior service; and automatically restoring operation of the wireless device to a state existing prior to automatic setting of the operation of the wireless device to conform to the behavior set and associated user preferences.

20. The method as set forth in claim 19 wherein the step of providing a behavior service defining behavior of wireless devices within a service area for a small area transmitter supporting wireless connectivity to the wireless devices further comprises:

transmitting a set of attribute-Value pairs defining behavior of wireless devices.

21. The method as set forth in claim 19, further comprising:

leaving the service area of the small area transmitter, wherein the behavior service becomes unavailable to the wireless device.

22. The method as set forth in claim 19, further comprising:

specifying, within the user preferences, one of automatic acceptance of the behavior, automatic rejection of the behavior, and notification of a user for manual acceptance or rejection of a behavior for each behavior associated with a known attribute within attribute-value pairs received from the small area transmitter, wherein the acceptance, rejection, or notification may be conditional or unconditional.

* * * * *